United States Patent [19]

Hubbard, Jr. et al.

[11] Patent Number: 4,935,614
[45] Date of Patent: Jun. 19, 1990

[54] REAL-TIME WAVEFRONT SENSOR FOR COHERENT WAVEFRONT CHARACTERIZATION

[75] Inventors: James E. Hubbard, Jr., Derry, N.H.; James L. Petivan, III, New Orleans, La.

[73] Assignee: The Charles Stark Draper Laboratory, Inc., Cambridge, Mass.

[21] Appl. No.: 333,637

[22] Filed: Apr. 5, 1989

[51] Int. Cl.$^5$ .............................................. G01J 1/20
[52] U.S. Cl. .................................. 250/201.1; 356/353
[58] Field of Search ........................ 250/201 R, 578; 356/353, 354, 359, 360

[56] References Cited

U.S. PATENT DOCUMENTS

| | | | |
|---|---|---|---|
| 3,731,103 | 5/1973 | O'Meara | 250/203 R |
| 3,923,400 | 12/1975 | Hardy | 356/354 |
| 3,980,879 | 9/1976 | O'Meara | 250/201 |
| 3,988,608 | 10/1976 | O'Meara | 250/201 |
| 4,016,415 | 4/1977 | O'Meara | 250/201 |
| 4,141,652 | 2/1979 | Feinleib | 356/121 |
| 4,399,356 | 8/1983 | Feinleib et al. | 250/201 |
| 4,438,330 | 3/1984 | Hardy | 250/201 |
| 4,441,019 | 4/1984 | Hardy | 250/201 |
| 4,472,029 | 9/1984 | Hardy | 350/360 |
| 4,575,248 | 3/1986 | Horwitz et al. | 356/353 |
| 4,696,573 | 9/1987 | Hutchin | 356/353 |
| 4,725,138 | 2/1988 | Wirth et al. | 356/121 |
| 4,744,659 | 5/1988 | Kitabayashi | 356/353 |

OTHER PUBLICATIONS

Johnson et al., "Phase-Locked Interferometry" 18 *Optical Engineering* 1: 46–52 (Jan./Feb. 1979).
Hardy, John W., "Active Optics: A New Technology for the Control of Light", 66 *Proceedings of the IEEE* 6: 651–697 (1978).

Primary Examiner—David C. Nelms
Assistant Examiner—Stephone B. Allen
Attorney, Agent, or Firm—Lahive & Cockfield

[57] ABSTRACT

The present invention is a two beam, double pass, phase shifting interferometric system for characterizing the phase profile of a radiation path. In the preferred form of the invention, a monochromatic beam is split into a reference beam and a test path beam. The test path beam is directed toward a fixed reflector which in turn directs that beam to the image sensor with a fixed length in the direction of propagation. The reference beam is directed to a movable reflector which directs that beam also to the image sensor, while introducing phase modulation. The system provides a measure of phase offset introduced into the reference beam at times of minimum or maximum intensity as measured by each photo detector in the image sensor, as the phase modulation of the reference beam is stepped over one complete wavelength. The phase profile of the test path is constructed using the accurate representation of the modulating refelector's position at the measured minimum or maximum intensity and the number of discontinuities in the phase offset data at each element's location.

14 Claims, 7 Drawing Sheets

FIG. 7A

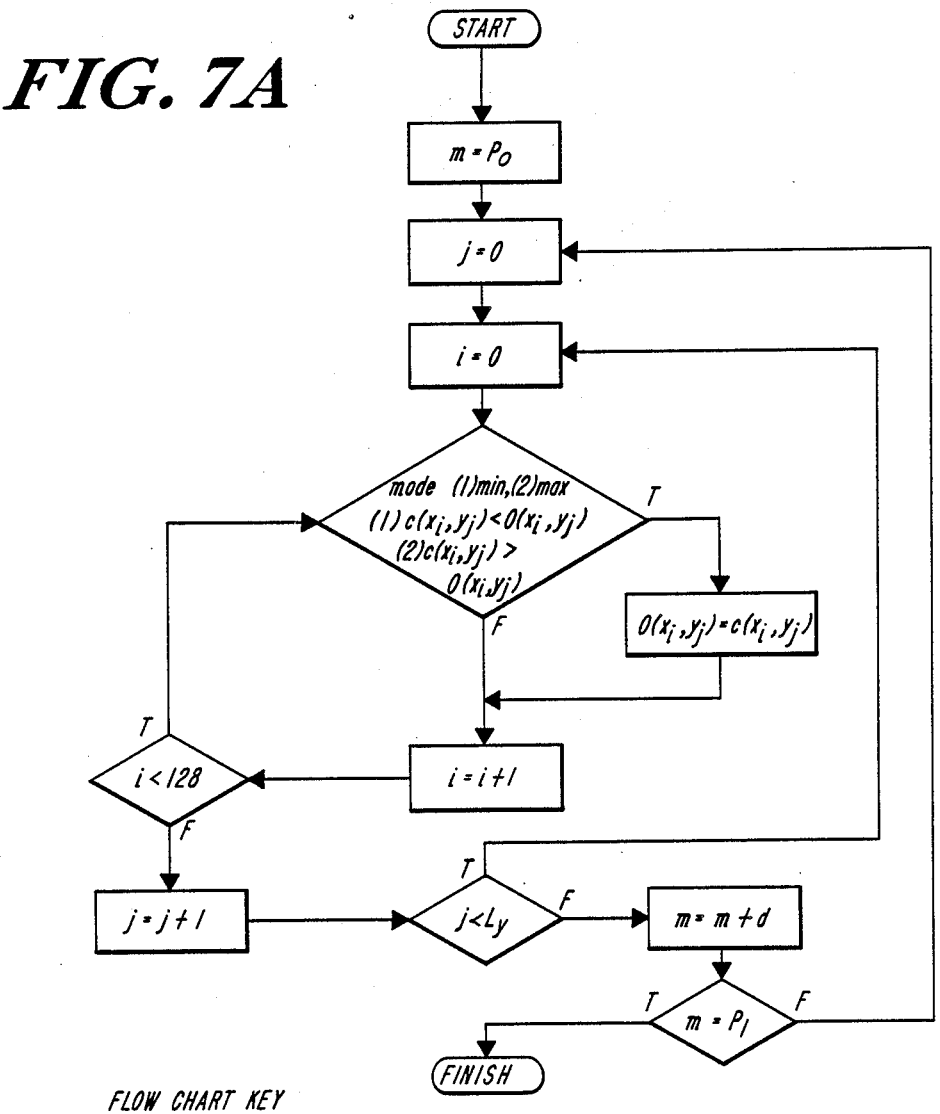

FLOW CHART KEY $m$ = CURRENT MIRROR POSITION
$c(x_i, y_j)$ = CURRENT INTENSITY DATA FOR LOCATION $x_i, y_j$
$O(x_i, y_j)$ = PREVIOUS MINIMUM INTENSITY DATA FOR LOCATION $x_i, y_j$
$L_y$ = NUMBER OF ACTIVE ROWS SELECTED BY USER.

FORWARD SCAN
$d = +1$
$P_0 = 0$
$P_1 = 1 +$ NUMBER OF MIRROR POSITION, $RM_n$, SELECTED BY USER

BACKWARD SCAN
$d = -1$
$P_0 =$ NUMBER OF MIRROR POSITION, $RM_n$, SELECTED BY USER
$P_1 = -1$

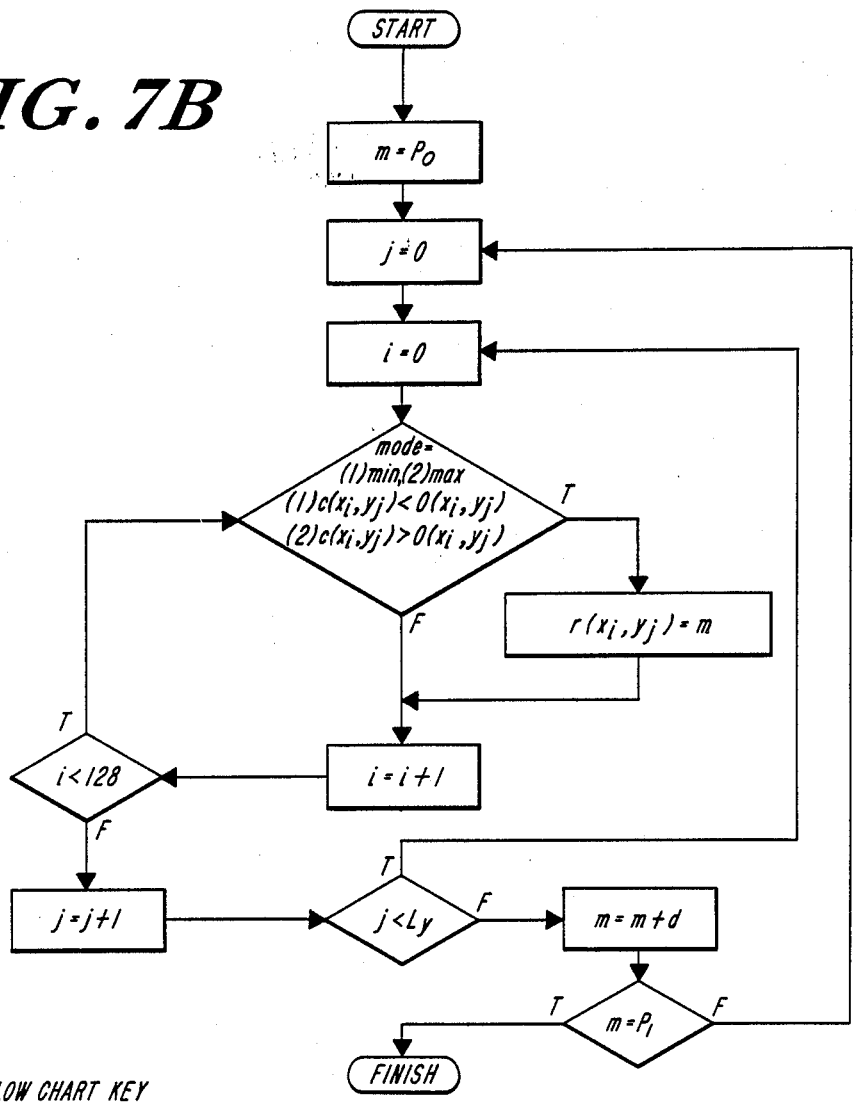

FIG. 7B

FLOW CHART KEY

$m$ = CURRENT MIRROR POSITION
$c(x_i, y_j)$ = CURRENT INTENSITY DATA FOR LOCATION $x_i, y_j$
$O(x_i, y_j)$ = PREVIOUS MINIMUM INTENSITY DATA FOR LOCATION $x_i, y_j$
$r(x_i, y_j)$ = MIRROR POSITION DATA FOR LOCATION $x_i, y_j$
$L_y$ = NUMBER OF ACTIVE ROWS SELECTED BY USER

FORWARD SCAN
  $d = +1$
  $P_O = 0$
  $P_I = 1 +$ NUMBER OF MIRROR POSITION, $RM_n$, SELECTED BY USER

BACKWARD SCAN
  $d = -1$
  $P_O =$ NUMBER OF MIRROR POSITION, $RM_n$, SELECTED BY USER
  $P_I = -1$ $n$ = BOUNDARY COUNTER
$r(x_i, y_j)$ = MIRROR POSITION DATA FOR LOCATION $x_i, y_j$
$h(x_i, y_j)$ = HALF WAVELENGTH BOUNDARY CROSSING DATA FOR LOCATION/ELEMENT
$\phi_l(x_i, y_j) = \pi [h(x_i, y_j) + (2/\lambda) \ast (r(x_i, y_j))]$

REAL-TIME WAVEFRONT SENSOR FOR COHERENT WAVEFRONT CHARACTERIZATION

BACKGROUND OF THE INVENTION

This invention relates to the field of adaptive optics systems and more particularly to real time optical wavefront sensors utilizing two beam phase modulating digital interferometers to characterize optical wavefront distortions.

Real time optical wavefront sensors are used to measure unwanted propagation path aberrations, such as atmospheric turbulence that distorts optical signals and degrades performance of optical processing systems. Characterizing the unwanted aberration permits correction for the aberration and the generation of an undistorted wavefront. Applications include direct line of sight communication systems and ground based telescopes limited by resolving power due to atmospheric distortions.

In addition, real time optical wavefront sensors are employed to determine the profile of an optical wavefront to allow for characterization of the medium of optical signal travel. Here, characterization of the wavefront profile is the information of interest. Applications include the analysis of phase objects such as optical components, biological samples, and the atmosphere.

A wavefront sensing technique that characterizes the phase profile of an optical path is disclosed by John W. Hardy; "Active Optics: A New Technology for Control of Light" Proceedings of the IEEE, Vol. 66, No. 6, June 1978. In this type of system, the real-time direct wavefront measuring system employs detectors to measure the relative phase shift of two beams. Appropriate instrumentation is utilized to construct the phase profile from the phase detector measurement. A primary shortcoming of a system described above is the greatly limited spatial bandwidth due to the requirement of having a phase measuring channel for each measurement location. Furthermore, typical of the prior art, these systems and systems known to those versed in the art which implement similar techniques, tend to have large computational requirements and subsequently operate at extremely slow system speeds.

Another type of wavefront sensing technique is the method described by Glen W. Johnson et al; Optics Engineering, Vol. 18, No. 1, January-February, 1979. This type of wavefront measuring system employs sinusoidal modulation of the reference wavefront and appropriate instrumentation to measure the local slope differential at a given location in the sensor's aperture between a phase modulated reference wave and an interference wave. A primary shortcoming in utilizing a technique as described is the computational requirements in generating the phase profile from the acquisition data to realize a real-time wavefront characterizing system.

It is an object of this invention to provide an improved optical wavefront measuring system.

Another object is to provide an improved system for characterizing the propagation path for an optical signal.

Yet another object is to provide a direct wavefront measuring system that utilizes the intensity information of the interference wave generated from a temporally phase modulated reference wave and a wave modified by an optical path to be measured to construct the phase profile of the optical path.

THE SUMMARY OF THE INVENTION

The present invention is a two beam, double pass, phase shifting interferometric system for characterizing the phase profile of a radiation path. The system utilizes intensity information of a "interference" beam together with a reflected reference beam which has been temporally phase modulated in a staircase pattern. The phase profile of the radiation path at a given location in the aperture of a multiple element radiation sensor is constructed from the phase offset introduced into the reference beam, when a minimum or maximum intensity is measured at that particular location in the aperture of the sensor and the number of discontinuities in that phase offset data. As used herein, the term "element" denotes a discrete photo detector within the multiple element image sensor.

The radiation source utilized dictates the type of phase profile characterizing; a light source, used in the present, allows for optical phase profile characterizing; and an acoustic source permits acoustic phase profile characterizing. In the preferred form of the invention, a light source is utilized to permit for optical phase profile characterizing.

In the preferred form of the invention, a monochromatic beam is split into a reference beam and a test path beam. The test path beam is directed toward a fixed reflector which in turn directs that beam to the image sensor with a fixed length in the direction of propagation. The reference beam is directed to a movable reflector which directs that beam also to the image sensor. The movable reflector is adapted for reciprocating motion along the reference beam axis to permit controlled phase modulation of that beam due to changes in the effective propagation path between that reflector and the image sensor.

In operation, the system completes direct wavefront characterization utilizing an extremely accurate high resolution phase modulating source to temporally phase modulate the reference wave in accordance with a cyclical staircase modulation signal.

The incident test path beam and the phase modulated reference beam recombine and are directed to the image sensor. The discrete photo detectors in the image sensor measure and convert the intensity of those beams into analog voltage signals on a pixel by pixel basis.

When the test beam path and the reference beam path are identical, the two beams combine in phase at each detector. When the optical transmission characteristics of the test beam path differs from those of the reference beam path, the two beams combine out of phase. Thus, the measured intensity is a function of the optical phase deviation of the reference wave with respect to the test path beam and thus is directly related to the characteristics of the optical phase profile of the test path. In the preferred embodiment, the system provides a measure of phase offset introduced into the reference beam at times of minimum or maximum intensity as measured by each photo detector, as the phase modulation of the reference beam is stepped over one complete wavelength $\lambda$ (by moving the reference beam reflector over a distance $\lambda/2$ of the double-pass propagation path). The phase profile of the test path is constructed using the accurate representation of the modulating reflector's position at the measured minimum or maximum intensity and the number of discontinuities in the phase offset data at each element's location.

A discontinuity in the phase offset data is defined as a phase difference between any two adjacent element's phase data that is greater than $+\pi/2$ or less than $-\lambda/2$. When a discontinuity in the phase data is encountered, a half-wavelength boundary has been crossed. However, in the present embodiment discontinuities are measured in quarter-wavelengths because of the double pass nature of the interferometric measurement.

In alternative embodiments, other intensity values may be used, such as local maxima, or some other predetermined value. Also, the reference beam reflector may be removed other than in reciprocal motion, and for distances different than $\lambda/2$. Also, in alternative forms of the invention, the roles of the test path beam and reference path beam may be interchanged.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 7a is a flowchart of the intensity processing operation of the system of FIG. 1;

FIG. 7b is a flowchart of the phase offset processing operation of the system of FIG. 1;

DESCRIPTION OF THE PREFERRED EMBODIMENT

1. General Description

Figure 1:
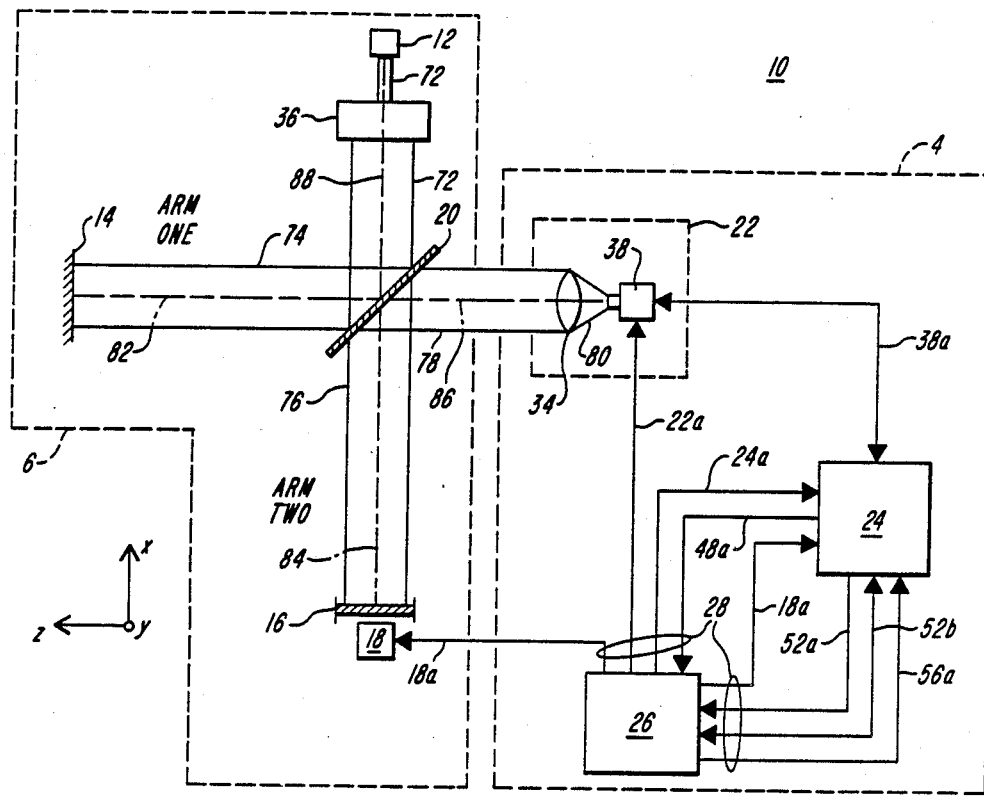
FIG. 1 is a schematic block diagram representation of the individual components of the system of a preferred embodiment in accordance with the present invention.

An exemplary measurement system 10 is shown in FIG. 1, embodying the present invention. System 10 includes a two beam, amplitude, double pass, phase shifting interferometer section 6 and a processing section 4.

In the illustrated embodiment, interferometer section 6 comprises a monochromatic coherent beam generating device 12, a beam expander lens assembly 36, and a beam splitting mirror 20, all positioned along a beam axis 88. Following beam splitter 20, separate and distinct beams are directed along a first path (denoted "Arm One" in FIG. 1) extending along axis 82 and a second path (denoted "Arm Two" in FIG. 1) extending along axis 84.

A stationary planar reflector (or mirror) 14 is positioned normal to axis 82 and is adapted to reflect light incident thereon back along axis 82, through beam splitter 20 and along coaxial axis 86, and through a collector lens assembly 34 to the surface of a multiple element optical detector array 38.

A movable planar reflector (or mirror) 16 is positioned along axis 84 and is adapted to reflect light incident thereon back along axis 84, off beam splitter 20, and through collector lens assembly 34 to the surface of detector array 38. A digital piezoelectric transducer (DPT) assembly 18 is coupled to mirror 16 in a manner permitting controlled reciprocal movement of mirror 16 along axis 84 in response to a control signal applied on line 18a. DPT assembly 18, operated in a closed servo loop, includes a piezoelectric actuator incorporating a capacitance micrometer as an integrated position sensor.

In this embodiment, axes 84 and 88 are coaxial, axes 82 and 86 are coaxial, axes 82 and 88 are mutually perpendicular, axes 86 and 88 are mutually perpendicular, and all of axes 82, 84, 86 and 88 are co-planar.

In the present embodiment, monochromatic coherent beam generating device 12 is type NRC Uniphase 1101 laser, manufactured by NRC. Mirrors 14 and 16 are type No. 20Z40, beam splitter 20 is type No. 40Q40, and beam expander lens assembly 36 is type no. T28-50-075, all manufactured by Newport Optical Components. In addition, DPT assembly 18 is type DIGITAL PIEZO manufactured by Queensgate Instruments.

With continued reference to FIG. 1, processing section 4 comprises a data acquisition section 22, a signal processing section 24 and a system control section 26. Information, consisting of both data and control signals, is transferred between the functional units by way of system bus 28, as described below.

Figure 2:
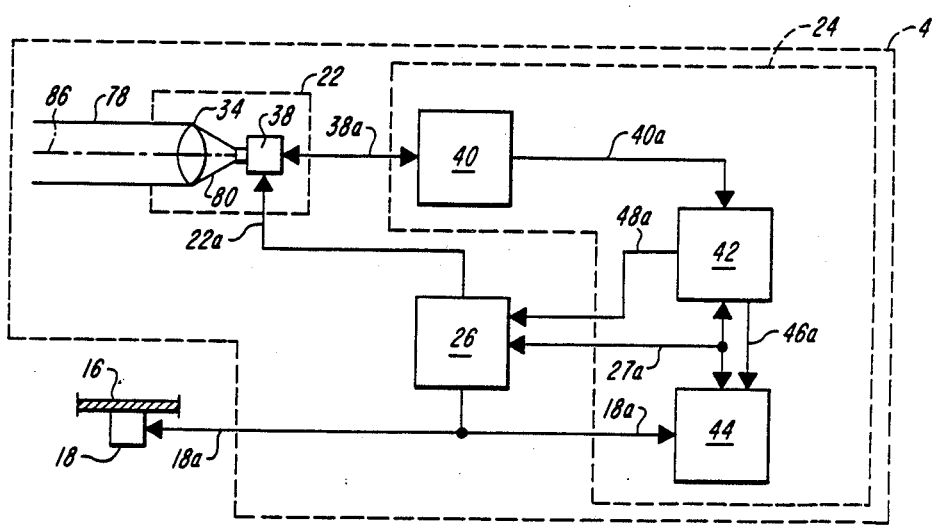
FIG. 2 is a detailed schematic block diagram representation of the processing section of the system of FIG. 1.

The data acquisition section 22, shown in FIG. 2, is comprised of a collector lens assembly 34 and a two-dimensional image sensor 38. In the illustrated embodiment, collector lens assembly 34 includes a telescope sight which compresses the fringe pattern of composite beam 78, along axis 86, to a diameter that matches the aperture of image sensor 38. In the present embodiment, collector lens assembly 34 is type No. 3-12×5, manufactured by Swarovski Optik NOVA.

The two-dimensional image sensor 38 consists of an array of individual photo detectors arranged in a 128×128 square matrix configuration. Each individual photo detector of image sensor 38 generates an analog voltage that is representative of the intensity of the monochromatic light incident on the respective photo detector.

Figure 3A:
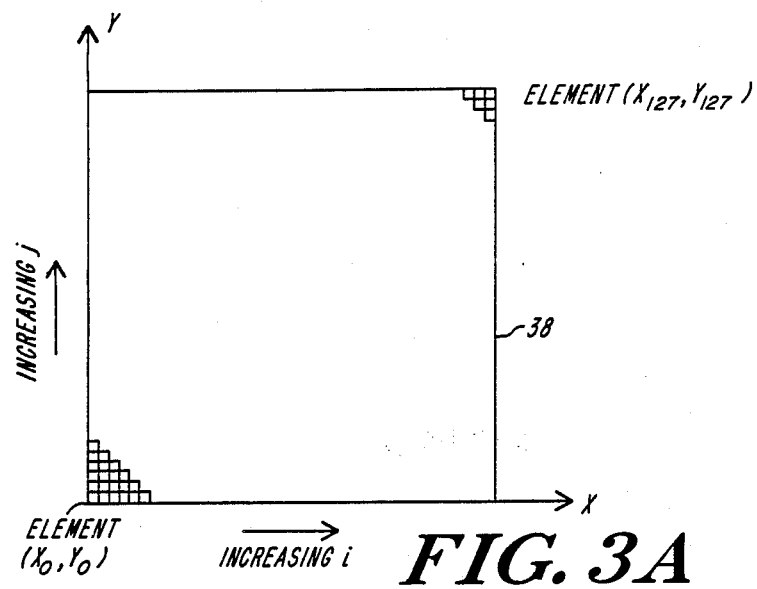
FIG. 3a depicts the image sensor internal configuration with respect to the $(x_i, y_j)$ position of each photo detector of the system of FIG. 1.

In the present embodiment the positions of the 128×128 photo detectors, comprising image sensor 38, are defined according to an $x_i$ and $y_j$ location of the matrix of image sensor 38. With reference to FIG. 3a, detector ($x_0$, $y_0$) corresponds to the bottom left corner and detector ($x_{127}$, $y_{127}$) corresponding to the top right corner. The y-direction values increase from bottom to top and the x-direction values increase from left to right. In the present embodiment, image sensor 38 is type No. MC9128D, a Reticon modular camera manufactured by EG&G.

The signal processing section 24, shown in FIG. 2, is comprised of an analog to digital (A/D) converter 40, an intensity processing section 42, and a phase processing section 44. In the illustrated embodiment, for each discrete position of mirror 16, A/D converter 40 generates an 8-bit digital word from the analog voltage output of each element in image sensor 38. The A/D converter 40 utilizes a time division multiplexing process to interrogate each photodetector element of the 128×128 square matrix configuration which comprises image sensor 38. For each element, prior to interrogating and converting the next element, A/D converter 40 interrogates (via bus 38a) and converts the voltage output and supplies the resultant digital output word to the intensity processing section 42 on line 40a. Thus, A/D converter 40 interrogates and converts the output of each active element in sensor 38 for a succession of positions of the phase modulating mirror 16 in a total scan profile. In the present embodiment, A/D converter 40 is type No. MATV-0811, manufactured by Analog Devices, Norwood, Mass.

Figure 4:
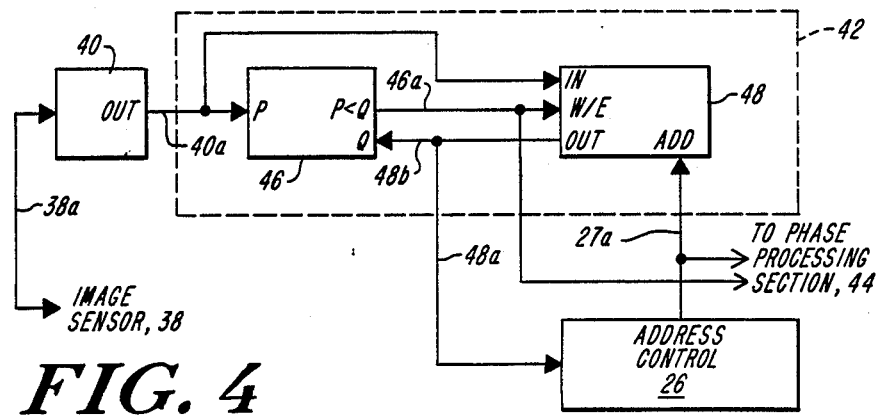
FIG. 4 is a detailed schematic block diagram representation of the intensity processing section of the system of FIG. 1.

The intensity processing section 42, shown in detail in FIG. 4, is comprised of a digital comparator 46, and a 16k×8 random access memory (RAM) 48. The intensity processing section 42 calculates and stores the minimum intensity measured by each photo detector detected during a scan cycle. In the illustrated embodiment, the output of A/D converter 40 is supplied, on line 40a, to comparator 46 which compares the presently measured intensity for a particular element to the previously stored minimum intensity for that same element, stored in RAM 48 and supplied to comparator 46 on line 48b. When the presently measured intensity for a particular element is less than the previously measured minimum intensity for that same element, the write enable (W/E) control input for RAM 48, controlled by the comparison result on line 46a, is active and a new minimum intensity is written into that element's memory location in RAM 48. If however, the presently measured intensity is greater than the previously measured minimum intensity stored in RAM 48, then the write enable control input for RAM 48 is not active and thus the present intensity measurement is not written into RAM 48. A unique address in RAM 48 is assigned to each element in sensor 38 to store the minimum intensity measured at each location within the aperture of sensor 38.

Figure 5A:
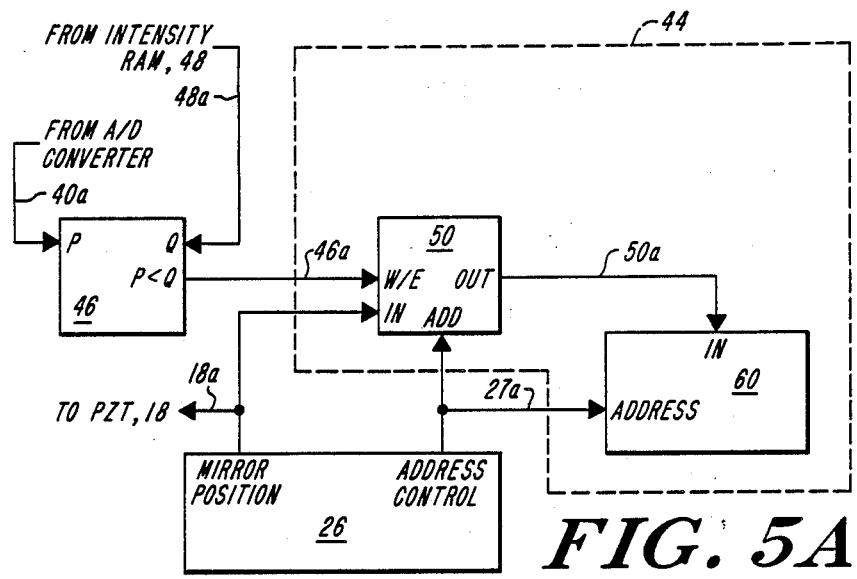
FIG. 5a is a detailed schematic block diagram representation of the phase processing section of the system of FIG. 1.

The phase processing section 44, shown in FIG. 5a, is comprised of a half-wavelength processing section 60 and a 16k×8 static RAM, RAM 50, to store information representative of the position of reference mirror 16. The phase processing section 44 calculates and stores phase profile information utilized by system control section 26 in constructing the optical phase profile of beam 74 propagating along axis 82.

In the illustrated embodiment, the phase processing section 44 stores both information representative of the position of reference mirror 16 that corresponds to the minimum intensity calculated and stored in the intensity processing section 42, and the number of discontinuities in each element's phase offset data. The information in RAM 50 is the representative of the quantity of phase modulation introduced into reference beam 76 extending along axis 84 when a minimum intensity is measured by each element in sensor 38. The input of RAM 50, on line 18a, is the same digital word that is supplied to DPT assembly 18 and thus, is directly related to the position of reference mirror 16 of the presently measured intensity converted and supplied to the intensity processing section 42. The write enable control input for RAM 50 is controlled by the outcome of the comparison process of comparator 46, as is RAM 48 in the intensity processing section 42 as described above. Thus, positional information of reference mirror 16 is written into RAM 50 when comparator 46 in the intensity processing section 42 determines that a minimum intensity for a particular element is measured. The system control section 26 synchronizes address control between the intensity processing section 42 and the phase processing section 44, via bus 27a, such that an identical memory map exist between RAMs 48, 50 and 52 in the intensity and phase processing sections 42 and 44, respectively.

Figure 5B:
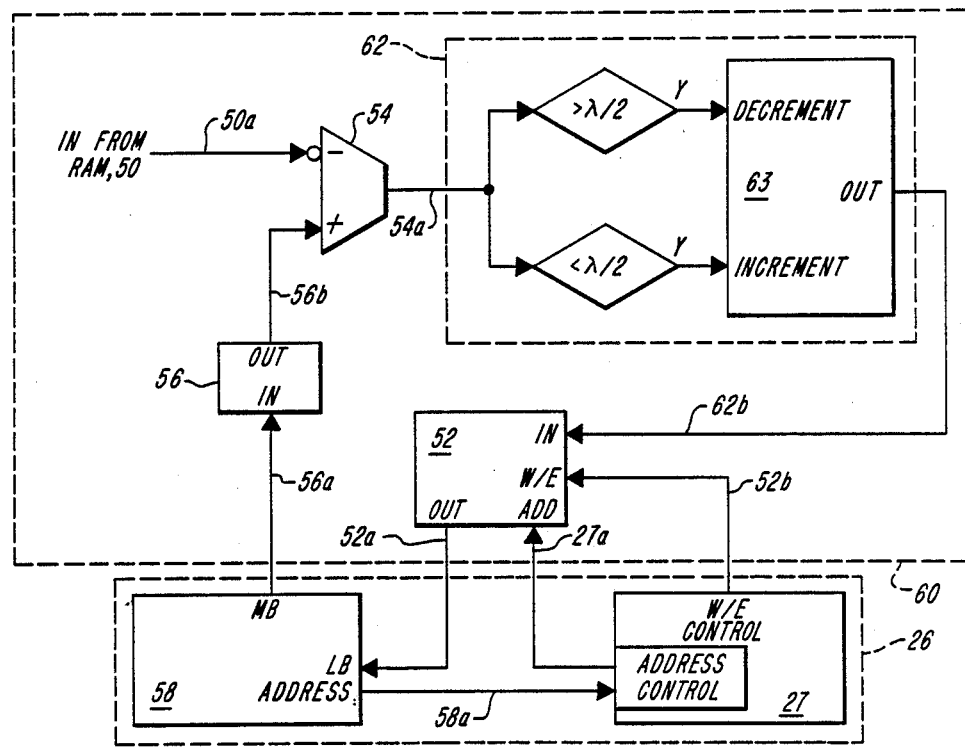
FIG. 5b is a detailed schematic block diagram representation of the half-wavelength processing section of the system of FIG. 1.

The half-wavelength processing section 60, shown in FIG. 5b, is comprised of a 16K×8 static RAM 52 to store the number of half-wavelength boundary crossings for each element of the sensor 38, an 8 bit data register 56 to store the previous position of reference mirror 16, an adder 54 and a boundary decision unit 62. The half-wavelength processing section 60, computes the number of discontinuities in each element's phase offset data stored in RAM 50. As described above, a discontinuity in the phase offset data is defined as a phase difference between any two adjacent element's phase data that is greater than $\lambda/2$ or less than $-\lambda/2$. When a discontinuity in the offset phase data is encountered, a half-wavelength boundary has been crossed. However, in the present embodiment discontinuities are measured in quarter-wavelengths because of the double pass nature of the interferometric measurement.

With continued reference to FIG. 5b, adder 54 subtracts the phase offset data, stored in RAM 50 and supplied to adder 54 on line 50a, to the phase offset data of the previous element, contained in register 56 and supplied to adder 54 on line 56b. The output of adder 54 is supplied, on line 54a, to the boundary decision unit 62 to determine if a half-wavelength boundary has been crossed between a particular element's phase data and the previous element's phase data. A master counter 63 in boundary decision unit 62 is decremented when the output of adder 54 is greater than $\lambda/4$ and incremented when the output of adder 54 is less than $-\lambda/4$. The output of boundary decision unit 62, supplied to RAM 52 on line 62b is defined as the number of discontinuities in a particular element's phase offset data. RAM 52 stores the count value from boundary decision unit 62 for use by the system control section 26 in constructing the optical phase profile of the beam 74. As defined above, address control of RAM 52 is synchronized to the overall operation of the intensity processing section 42 and the previously described segments of the phase processing section 44.

In the present embodiment, static RAM 48, 50 and 52 are type no. IDT71981S, manufactured by Integrated Device Technologies.

The system control section 26 is comprised of an electronic control unit 27 and a system computer 58.

The system control section 26 provides necessary synchronization and control signals, via system bus 28, to processing section 24, data acquisition section 22 and interferometer 6 to realize the exemplary measuring system 10.

In the illustrated embodiment, the electronic control unit 27 provides information and commands such as address control, on bus 27a, to the intensity processing section 42 and the phase processing section 44, reference mirror 16 position information, on line 18a, to DPT assembly 18 and phase processing section 44, and scan commands, on bus 22a, to image sensor 38.

The system computer 58, contained in the system control section 26, provides an interface between system 10 and the user and further provides overall control for system 10, which includes executory address control, on bus 58a, to electronic control unit 27. In the present embodiment the system computer 58 is type no. IBM PC AT manufactured by International Business Machine Corp., Poughkeepsie, N.Y.

2. Analytical Characterization of an Interference wavefront

Figure 3B:
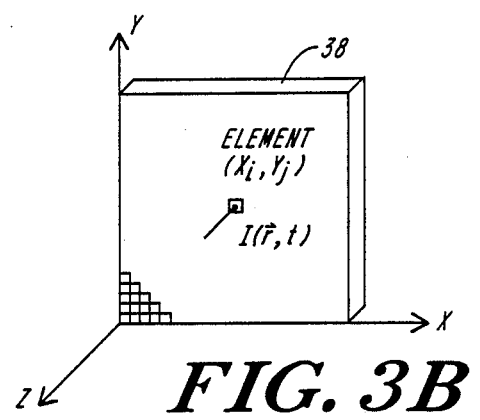
FIG. 3b depicts the photo detector $(x_i, y_j)$ in reference to the intensity of the light at that photo detector of the system of FIG. 1.

The photo detectors comprising image sensor 38, measure the energy of the optical field by integrating the intensity of the incident light over the exposure time. The intensity I(r,t) of a wave, depicted in reference to image sensor 38 in FIG. 3b and characterized below, is the amount of energy transported by the wave that flows per unit time across a unit area perpendicular to the direction of travel of the wave:

$$I(r,t) = |E(r,t)|^2$$

where electric field E(r,t) may be characterized as:

$$E(r,t) = A(r,t)e^{j\phi(r,t)} \quad (1)$$

The electric field is a scalar quantity providing the light beams are all unpolarized or have approximately the same polarization. In addition, the description of the electric field E(r,t) in EQU. 1, is time averaged to eliminate its optical frequency component which is at a very high frequency ($\simeq 5*10^{14}$ Hz). Furthermore, the electric field detailed in EQU. 1 incorporates the premises that all light has approximately the same direction of propagation at the point of observation.

Beam 78 detected at optical sensor 38 is a combination of beam 74, from arm one, and beam 76, from arm two. The intensity of beam 78, created by the overlapping electric fields, is the magnitude squared of the sum of the two overlapping electric fields $E_1(r,t)$, of beam 74, and $E_2(r,t)$, of beam 76. Thus beam 78, measured by optical sensor 38, is characterized in terms of the two overlapping electric fields as:

$$E(r,t) = E_1(r,t) + E_2(r,t) \quad (2)$$

And therefore the intensity measured at each detector is:

$$I(r,t) = |E(r,t)|^2$$

$$I(r,t) = E(r,t) \cdot E^*(r,t) \quad (3)$$

Incorporating Equations 1 and 2 into Equation 3 produces the intensity expression of:

$$I(r,t) = [A_1(r,t)e^{j\phi_1(r,t)} + A_2(r,t)e^{j\phi_2(r,t)}]^* \\ [A_1(r,t)e^{-j\phi_2(r,t)} + A_2(r,t)e^{-j\phi_2(r,t)}]$$

which is rewritten into the form of:

$$I(r,t) = A_1^2(r,t) + A_2^2(r,t) + \\ 2A_1(r,t)A_2(r,t)\cos[\phi_1(r,t) - \phi_2(r,t)] \quad (4)$$

Each individual photo detector of image sensor 38 generates an analog voltage representation of the intensity I(r,t) of beam 78 as described above. The intensity at the input of each photo detector in image sensor 38 may be characterized further as:

$$I(r,t) = A_1^2(r) + A_2^2(r) + \\ 2A_1(r)A_2(r)\cos[\phi_1(r) - \phi_2(t)] \quad (5)$$

providing that the amplitudes of the two interfering beams, 74 and 76, are assumed not to vary during the wavefront measurement, the optical path defined by beam 74 is slowly varying with time compared to beam measurements, and the phase offset introduced into beam 76 by reference mirror 16 is uniform across aperture of image sensor 38.

$\phi_2(t)$ is defined as the temporal phase modulation introduced by reference mirror 16 into beam 76 and is characterized as:

$$\phi_2(t) = M(t) = [2\pi/\lambda]2 \times (t)$$

where M(t) is defined as $0 \leq M(t) < 2\pi$ to obtain an accurate representation of the phase profile of beam 74. However, due to the double pass nature of interferometer 6, stepping reference mirror 16 from $0 \leq X(t) < \lambda/2$ corresponds to introducing a phase shift into reference beam 76 of $0 \leq \phi_2(t) < 2\pi$.

The minimum intensity at the input of any photo detector $(x_i, y_j)$ in image sensor 38 occurs when the argument of the sinusoidal function in Equation 5 is of the form:

$$\phi_1(x_i, y_j) - M(t) = \pi + 2n\pi$$

where n is an element of the integer set.

Similarly, the maximum intensity occurs when the argument of the sinusoidal function is of the form:

$$\phi_1(x_i, y_j) - M(t) = 2n\pi.$$

where n is an element of the integer set.

Thus, the phase $\phi_1(t)$ of beam 74 at a given location $(x_i, y_j)$ is constructed using the phase offset $\phi_2(t)$ introduced into reference beam 76 that generated a maximum or minimum intensity at that element's location and the number of discontinuities in the phase offset data, $\phi_2(t)$, which is related to the $(2n\pi)$ or $(\pi + 2n\pi)$ terms.

The present embodiment employs the use of either the minimum or maximum voltage output of each element of image sensor 38 to determine the phase $\phi_1(t)$ of beam 74. The system operation below, describes system 10 utilizing the minimum voltage output of each element. Thus, the phase profile of beam 74 is constructed using the relationship derived above and shown below:

$$\phi_1(x_i,y_j) = M(t) + (\pi + 2n\pi) \qquad (6)$$

where M(t) is equal to the position of reference mirror 16 at minimum intensity for location $(x_i,y_j)$ stored in RAM 50 and $(\pi+2n\pi)$ is proportional to the number of discontinuities in the phase offset data at location $(x_i,y_j)$ stored in RAM 52.

3. System Operation

With reference to FIG. 1, a single monochromatic beam 70, generated in laser 12, exits the laser cavity and is immediately filtered, collimated and expanded to a desired diameter via lens assembly 36. The widened and filtered beam 72 strikes beam splitter 20 causing half of the light generated by laser 12, beam 74, to be reflected along traverse axis 82, and the remaining half of the light generated by laser 12, beam 76, to be transmitted along axis 84. The profile of the path defined by beam 74 along axis 82, the optical path to be characterized, is altered (i.e. due to aberrations in the path of beam 74) and is reflected, by mirror 14, back along axis 82 to beam splitter 20. Beam 76, the reference beam, is reflected with a controlled optical phase offset by the movable planar reference mirror 16 along axis 84.

Reference mirror 16 is the temporal phase modulating source for beam 76. Reference mirror 16 is translated in the x-direction in a user selected number of steps, to alter the optical path length of beam 76 and thereby introduce a controlled optical phase shift. A detailed description of the operation and function of reference mirror 16 follows.

Figure 6A:
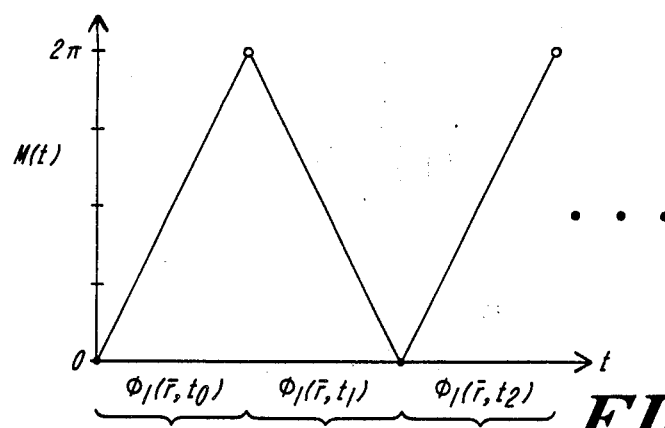
FIG. 6a is the reference mirror scan profile as function of the temporal phase modulation of the reference beam for use with the system of FIG. 1.
Figure 6B:
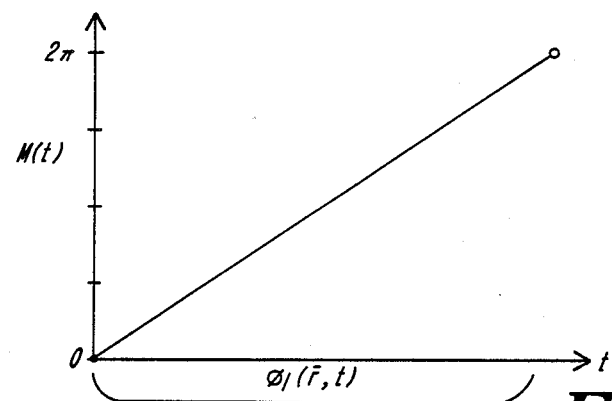
FIG. 6b is the reference mirror forward scan profile as function of the temporal phase modulation of the reference beam for use with the system of FIG. 1.

Reference mirror 16 is translated in the x-direction in a sawtooth pattern, depicted in FIG. 6a, to introduce a controlled phase shift into reference beam 76. Altering the x-direction position of reference mirror 16 causes fractional variations in the optical path length of reference beam 76 and thereby creates a deviation of the phase in reference beam 76. An accurate and complete characterization of the phase profile of the optical path of beam 74 requires reference mirror 16 to phase modulate reference beam 76 such that a phase offset of $0 \leq \phi_2(t) < 2\pi$ is introduced into beam 74, as shown in FIG. 6b.

Translation of reference mirror 16 is realized using an extremely accurate high resolution digital piezoelectric transducer (DPT) assembly 18 which is controlled by electronic control unit 27.

DPT 18 is a piezoelectric actuator incorporating a capacitance micrometer as an integrated position sensor. This internal micrometer has a positional resolution of much better than a nanometer and no hystersis. DPT 18 is operated in a closed servo loop and is capable of sub-nanometer resolution, repeatability and stability.

DPT assembly 18, in response to commands, on line 18a, from electronic control unit 27 expands or contracts depending upon the direction of reference mirror 16 scan. Expansion of DPT assembly 18 corresponds to the positive sloped ramp of the sawtooth waveform in FIG. 6a. Contraction of DPT assembly 18 corresponds to the negative sloped ramp of the sawtooth waveform in FIG. 6a. However, since the position of reference mirror 16 is controlled by digital circuitry, the resolution of the scan profile of reference mirror 16 is finite, as characterized in FIG. 6c.

Figure 6C:
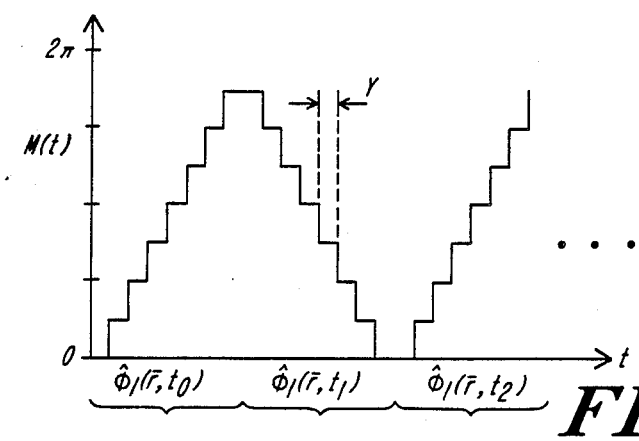
FIG. 6c is the digital representation of the reference mirror scan profile of FIG. 6a depicting eight mirror steps within one complete scan interval ($RM_n = 8$ positions, $n=3$) as a function of the temporal phase modulation of the reference beam for use with the system of FIG. 1.

With reference to FIG. 6c, the number of intermediate locations of the total scan interval of reference mirror 16 is user selectable from a range of $4 \leq RM_n \leq 2^8$ (256). Reference mirror 16 remains at a particular x-position for time period of $\gamma$ seconds which corresponds to the time required for A/D converter 40 to interrogate and sample all the elements in image sensor 38 for a given position of reference mirror 16. Thus, the speed of system 10 is directly related to the user selected number of intervals $RM_n$.

The photo detectors, upon a scan command on signal bus 22a from electronic control unit 27, sample the fringe pattern generated along axis 86 of interferometer 6. As described above, each photo detector generates an analog voltage which is representative of the incident intensity of the fringe pattern of beam 78.

System 10, permits the user to select the number of active elements in image sensor 38 and thereby tailor system 10 to the spatial resolution and overall speed to desired requirements. With reference to FIG. 3a, the number of active photo detectors in image sensor 38 is expanded or contracted according to the number of active rows selected by the user. The number of active elements is user selected from a range of $(1 \times 128) \leq PD_n \leq (128 \times 128)$. Thus, the speed of system 10 is further related to the user selected number of active image sensor elements $PD_n$.

A detailed description of the data processing required to obtain the phase profile of the optical path along axis 82 follows.

In this embodiment and for purposes of clarity, the initial position of reference mirror 16 translates into zero phase offset of beam 76 (i.e. $\phi_2|_{T=o} = 0$ radians) and reference mirror 16 is scanned in the forward direction.

With reference mirror 16 at the $x=0$ position, the digital representation of the intensity measured by sensor 38 is supplied to intensity processing section 42. Due to reference mirror 16 being at an initial position, each element's sample is stored in that element's unique location in RAM 48 without further processing. In addition, the initial position of reference mirror 16 is stored in phase processing section 44, particularly in RAM 50. After all elements in sensor 38 are interrogated by A/D converter 40, RAM 48 contains the intensity information corresponding to the initial position of reference mirror 16 and RAM 50 contains the initial position of reference mirror 16.

Next, DPT assembly 18 is commanded to expand which translates into moving reference mirror 16 to the next step and whereby introduce a new phase offset into beam 76. The fringe pattern of beam 80 for the new phase offset in beam 76 is sampled by the photo detectors, their outputs are converted by A/D converter 40 and supplied to intensity processing section 42.

The intensity processing section 42 completes the intensity processing operation to determine the minimum intensity sampled at each photo detector as reference mirror 16 is stepped through one complete scan interval, $\lambda/2$. The intensity processing operation compares a photo detector's output to a previously measured intensity at the same element location so as to obtain the minimum intensity at that element location as the phase offset of beam 76 is stepped through one complete interval (i.e. $0 \leq \phi_2(t) < 2\pi$). A detailed description of the intensity processing operation follows.

The intensity processing operation, characterized by the flowchart in FIG. 7a, completes a comparison between intensities of a particular photo detector as the phase offset of beam 76 is stepped over a $2\pi$ interval. As the phase offset of beam 76 is swept through a $2\pi$ interval, the intensity measured at a particular location in the aperture of image sensor 38 varies as described above. The intensity processing operation compares the intensity stored in RAM 48 for a given element to the intensity measured by that same element but due to a different position of reference mirror 16. If the sampled intensity for a particular photo detector corresponding to the present phase offset of beam 76 is less than the previously stored minimum intensity for that particular element, then the minimum intensity corresponding to the present phase offset of beam 76 replaces the previous minimum intensity stored in RAM 48. If however, the present phase offset generates an intensity that is greater than the previous minimum intensity, then no new intensity information is written into RAM 48.

The intensity processing operation continues for all active photo detectors at each discrete position of reference mirror 16 within the total mirror scan interval. Thus, at the completion of the intensity processing operation, RAM 48 contains the minimum intensity measured by each photo detector.

The phase processing section 44, which operates in conjunction with the intensity processing section 42, completes the phase offset processing operation to characterize the phase offset profile of the optical path defined by beam 74. The phase offset processing operation, operating in synchronism with intensity processing section 42, stores the position of reference mirror 16 that corresponds to the minimum intensity stored in RAM 48. A detailed description of the phase offset processing operation follows.

The phase offset processing operation, characterized by the flow chart in FIG. 7b, operates in conjunction with the result of the comparison operation in the intensity processing operation. If the comparison operation defines the present sampled intensity to be less than the previous minimum intensity, then the position of reference mirror 16, that corresponds to present intensity information, is written into RAM 50. If however, the comparison operation, of comparator 46, defines the present intensity information to be greater than the previous minimum intensity, then no new information is written into RAM 50.

After all the outputs of the active elements are processed in intensity processing section 24, as described above, system control section 26 commands DPT assembly 18 to expand and thereby move reference mirror 16 to the next position. The fringe pattern of beam 80, for the new phase offset in beam 76, is sampled by the photo detectors and their outputs are converted and processed as described above. The intensity and phase offset processing operations continue until the phase offset of beam 76 has been stepped through a complete scan interval as defined in FIG. 6c.

Upon completion of a scan interval of reference mirror 16, RAM 48 contains a profile of the minimum intensity measured by each element in image sensor 38 and RAM 50 contains the position of reference mirror 16 that corresponds to that minimum intensity information stored in RAM 48. As described above, information representative of the position of reference mirror 16, contained in RAM 50, is directly proportional to the phase offset data used to compute the phase profile of the optical path defined by beam 74, along axis 82.

The intensity information contained in RAM 48 is related to the amplitude of the light along axis 86. System control unit 26, on line 48a, interrogates and acquires the intensity information contained in RAM 48 to perform diagnostics of system 10.

The half-wavelength processing section 62 completes the half-wavelength boundary processing operation to compute the number of discontinuities in the phase offset data contained in RAM 50. As previously described, in the present embodiment a discontinuity in the phase offset data corresponds to a phase difference between any two adjacent element's phase data that is greater than $\lambda/4$ or less than $-\lambda/4$. A detailed description of the half-wavelength processing operation follows.

Figure 8:
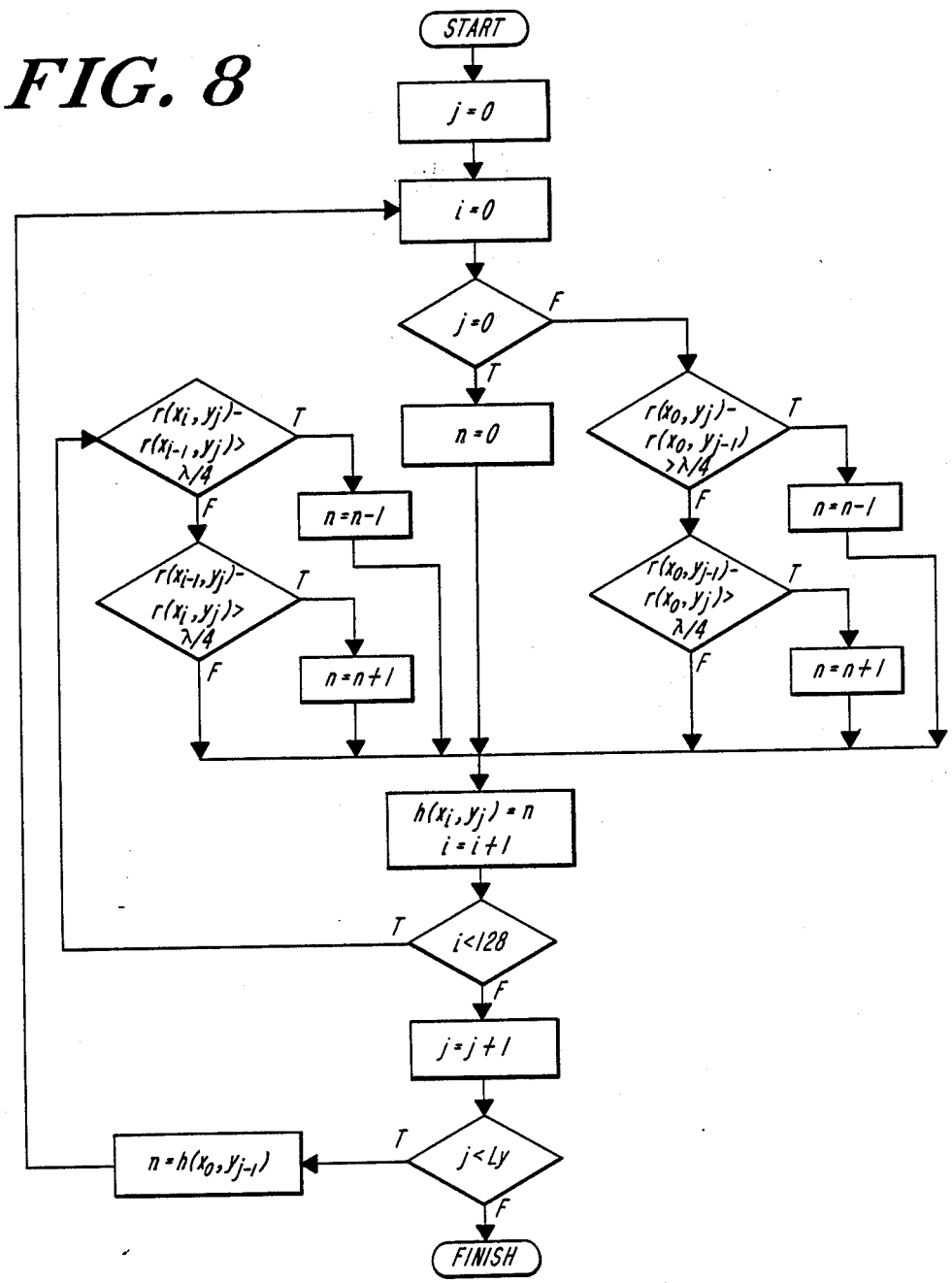
FIG. 8 is a flowchart of the half-wavelength processing operation of the system of FIG. 1.

The half-wavelength processing operation, characterized by the flow chart in FIG. 8, processes the phase offset data to determine discontinuities in that data and generates a discontinuity count utilized in constructing the phase of the optical path of beam 74. The half-wavelength processing section makes a comparison between the phase offset data for a given photo detector and the phase offset data for the preceding photo detector. If a half-wavelength boundary is crossed, then a discontinuity has been encountered. The master counter 63, in boundary decision unit 62, is incremented if $$r(x_{i-1}, y_j) - r(x_i, y_j) > \lambda/4$$

or is decremented if $$r(x_i, y_j) - r(x_{i-1}, y_j) > \lambda/4.$$

where $r(x_i, y_j)$ corresponds to the phase offset data for a given photo detector and $r(x_{i-1}, y_j)$ corresponds to phase offset data for the preceding photo detector. If however, a discontinuity is not encountered, then master counter 63 is neither incremented nor decremented. At the completion of the half-wavelength boundary processing operation, RAM 52 contains discontinuity information that is directly related to the $(\pi + 2\pi n)$ term detailed in EQU. 6 above.

4. Optical Phase Profile Construction

System computer 58 utilizes the information in RAM 50 and RAM 52, in conjunction with the equation below, to construct the optical phase profile of the optical path defined by beam 74, along axis 82.

$$\phi_1(x_i, y_j) = \pi]h(x_i y_j) + (2/\lambda)^* r(x_i, y_j)]$$

where $h(x_i, y_j)$ is the half-wavelength information contained in RAM 52 and $r(x_i, y_j)$ is the phase offset information contained in RAM 50.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for determining the radiation transmission characteristics of a region along a reference axis comprising:
   A. means for generating a first substantially single frequency radiation beam along a first axis said first radiation beam being characterized by a wavelength $\lambda$;
   B. beamsplitter including means for splitting said first beam into a second beam and a third beam, means for directing said second beam along a second axis, and means for directing said third beam along a third axis, wherein one of said directed second and third beams at least in part propagates through said region;

C. a first reflector fixedly positioned along said second axis and including means for reflecting said second beam incident thereon back along said second axis;

D. a second reflector positioned along said third axis and including means for reflecting said third beam incident thereon back along said third axis;

E. control means for varying the position of said second reflector in a range extending along said third axis between a first reference point and a second reference point on said third axis, wherein said second reference point is spaced apart from said second reference point by $\lambda/2$;

F. means for establishing a fourth beam and directing said fourth beam along a fourth axis, said fourth beam being a combination of said reflected second and third beams;

G. an array of radiation detectors positioned along and extending transverse to said fourth axis and including means responsive to portions of said fourth beam incident thereon for generating intensity signals, each of said intensity signals being representative of the intensity of the portion of said fourth beam incident on an associated detector of said array;

H. processing means responsive to said control means and said intensity signals for generating phase profile signals, said processing means including means for identifying the times at which each of said intensity signals substantially has a predetermined value, and generating said phase profile signals to be representative of the position of said second reflector at the respective ones of said identified times, said phase profile signals being representative of the optical phase profile of said reflected second beam at said combining means.

2. A system according to claim 1 wherein said array of detectors is a substantially planar array.

3. A system according to claim 1 wherein said control means includes means for cyclically controlling the position of said second reflector to have reciprocal motion between said first and second reference points.

4. A system according to claim 1 wherein said control means includes means for controlling said reciprocal motion to be incrementally stepped.

5. A system according to claim 1 wherein said control means includes means for controlling said reciprocal motion to be substantially continuous.

6. A system according to claim 1 wherein said generating means is a light source, whereby said first radiation beam is light beam that is substantially monochromatic.

7. A system according to claim 6 wherein said generating means is a laser, whereby said first light beam is substantially coherent.

8. A system according to claim 6 wherein said radiation detectors are optical detectors.

9. A system according to claim 8 wherein said array of detectors is a substantially planar array.

10. A system according to claim 1 wherein said generating mean is an acoustic source.

11. A system according to claim 10 wherein said radiation detectors are acoustic detectors.

12. A system according to claim 11 wherein said array of detectors is a substantially planar array.

13. A system according to claim 1 wherein said predetermined value is a local minimum.

14. A system according to claim 1 wherein said predetermined value is a local maximum.

* * * * *